United States Patent [19]
Lovett

[11] Patent Number: 6,116,438
[45] Date of Patent: Sep. 12, 2000

[54] POOL ACCESSORY STORAGE UNIT

[76] Inventor: Charles Lovett, 537-51 St., Altoona, Pa. 16602

[21] Appl. No.: 09/296,312

[22] Filed: Apr. 22, 1999

[51] Int. Cl.$^7$ ........................................................ A47F 5/00
[52] U.S. Cl. ......................... 211/194; 211/180; 211/85.7; 211/14
[58] Field of Search .................................... 211/194, 189, 211/180, 126.2, 126.14, 14, 85.7

[56] References Cited

U.S. PATENT DOCUMENTS

| | | | |
|---|---|---|---|
| 2,569,555 | 10/1951 | Chanslor et al. | |
| 3,675,338 | 7/1972 | Maki . | |
| 4,199,069 | 4/1980 | Talarico | 211/194 |
| 4,531,752 | 7/1985 | Diener | 211/189 X |
| 4,862,602 | 9/1989 | Krill | 211/194 X |
| 4,981,225 | 1/1991 | Cole | 211/180 X |
| 5,875,904 | 3/1999 | Vorstenbosch | 211/180 |

*Primary Examiner*—Robert W. Gibson, Jr.

[57] ABSTRACT

A pool accessory storage unit is provided including a frame having an upper portion and a lower portion each with a rectilinear configuration. The upper portion and lower portion of the frame each are defined by a plurality of interconnected horizontally oriented bars. Each frame each further includes a plurality of stanchions for maintaining the bars of the upper portion and lower portion fixed with respect to each other. A panel assembly is provided including a plurality of flexible panels for encompassing sides and a bottom of the frame, thereby defining an interior space.

9 Claims, 2 Drawing Sheets

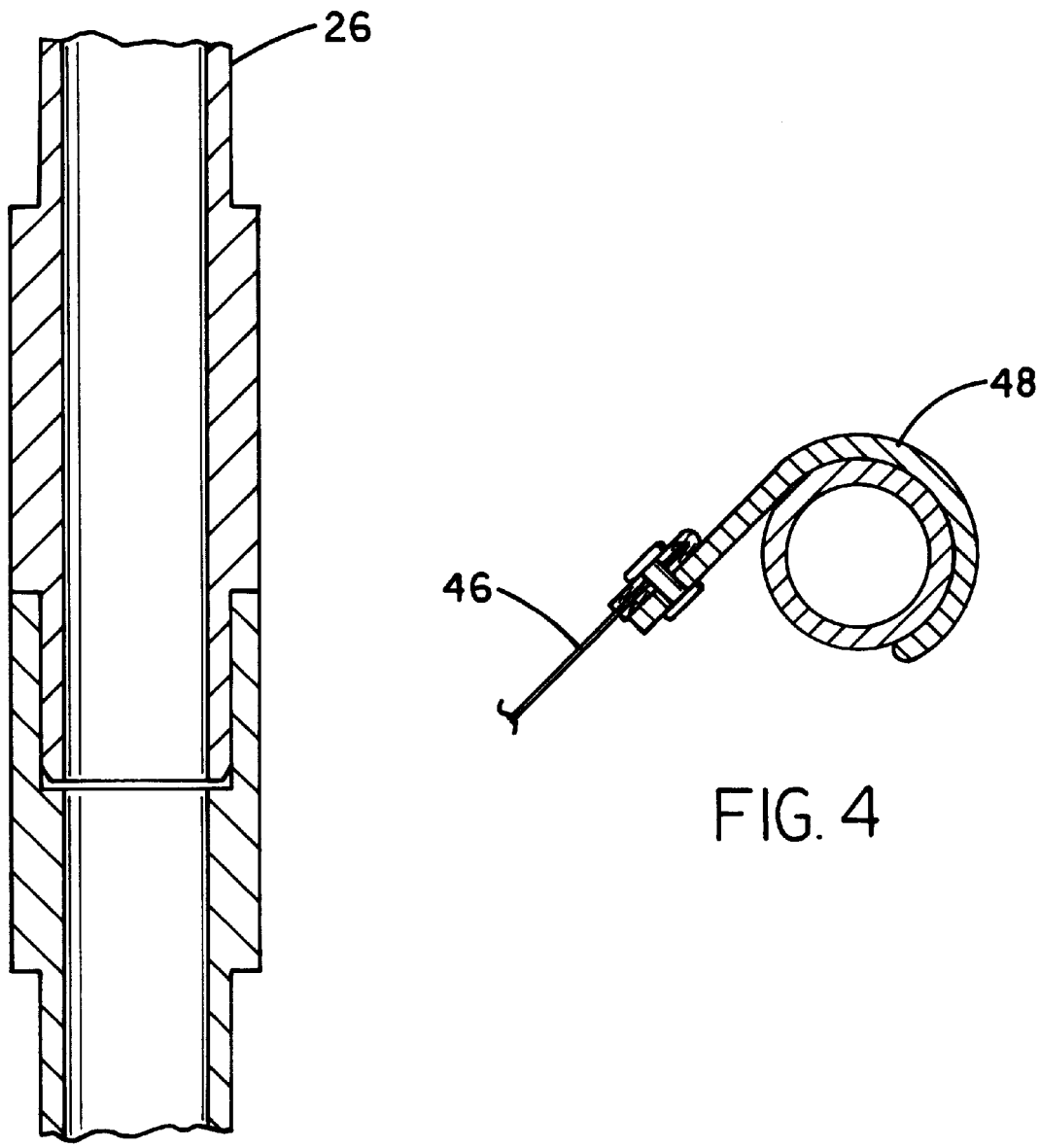
FIG. 3
FIG. 4
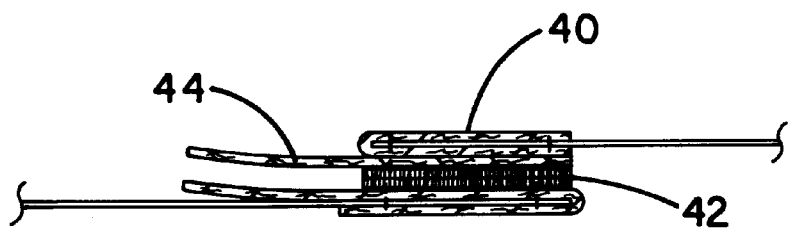
FIG. 5

POOL ACCESSORY STORAGE UNIT

BACKGROUND OF THE INVENTION

1. Field of the Invention

The present invention relates to storage and support devices and more particularly pertains to a new pool accessory storage unit for storing various pool accessories adjacent a pool in an easily accessible manner.

2. Description of the Prior Art

The use of storage and support devices is known in the prior art. More specifically, storage and support devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art storage and support devices include U.S. Pat. No. 4,664,266; U.S. Pat. No. 5,474,188; U.S. Pat. No. Des. 375,231; U.S. Pat. No. 2,819,901; U.S. Pat. No. 5,626,307; and U.S. Pat. No. 3,475,025.

In these respects, the pool accessory storage unit according to the present invention substantially departs from the conventional concepts and designs of the prior art, and in so doing provides an apparatus primarily developed for the purpose of storing various pool accessories adjacent a pool in an easily accessible manner.

SUMMARY OF THE INVENTION

In view of the foregoing disadvantages inherent in the known types of storage and support devices now present in the prior art, the present invention provides a new pool accessory storage unit construction wherein the same can be utilized for storing various pool accessories adjacent a pool in an easily accessible manner.

The general purpose of the present invention, which will be described subsequently in greater detail, is to provide a new pool accessory storage unit apparatus and method which has many of the advantages of the storage and support devices mentioned heretofore and many novel features that result in a new pool accessory storage unit which is not anticipated, rendered obvious, suggested, or even implied by any of the prior art storage and support devices, either alone or in any combination thereof.

To attain this, the present invention generally comprises a plurality of stackable frames each having an upper portion and a lower portion each having a rectangular configuration. Such upper and lower portions are defined by a pair of elongated side bars and a pair of short end bars interconnected via corner couples. Each couple has a tube mounted thereon which resides along an axis which is perpendicular with respect to the bars of the portions of the frame. As shown in FIGS. 1 & 2, each frame each further includes four stanchions each with a length equal to that of the end bars of the portions. The stanchions are further coupled between the tubes of the corners of the upper portion and the lower portion of each frame to render a rigid, fixed frame. As an option, the tubes of the couples of the lower portion of a first frame may be coupled with those of the upper portion of a second frame, as shown in FIG. 1. Next provided are a plurality of net assemblies each adapted to define an interior space within each frame. Each net assembly includes four meshed nets with a plurality of integral sleeves integrally coupled thereto for being received by the stanchions of the frame. The net assembly further includes a plurality of detachable sleeves for being received by the bars of the frames. The detachable sleeves each have a rectangular strip coupled along a length thereof with a plurality of linearly aligned plastic snap fasteners mounted thereon. Such snap fasteners are adapted for releasably coupling with plastic snap fasteners mounted on the meshed nets of the net assembly. As shown in the FIGS. 1 & 2, the meshed nets come in two lengths. Each of the longer meshed nets of each net assembly have a vertically oriented bisecting slit formed between the detachable sleeves thereof. As such, a pair of termination edges are defined which are each lined with a pile fastener. As shown in FIG. 5, a pull tab is coupled to a central extent of the pile fastener and extends therefrom for allowing access to the interior space. Each net assembly further has a hammock including a meshed net with a rectangular configuration. The hammock is equipped with a pair of free elongated side edges and a pair of short end edges. The short end edges each have a plurality of J-shaped hooks mounted along a length thereof for being hooked onto the end bars of the upper portion of the frame. Note FIG. 4. By this structure, the meshed net of the hammock depends downwardly level with the lower portion of the frame, as shown in FIG. 1.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pool accessory storage unit apparatus and method which has many of the advantages of the storage and support devices mentioned heretofore and many novel features that result in a new pool accessory storage unit which is not anticipated, rendered obvious, suggested, or even implied by any of the prior art storage and support devices, either alone or in any combination thereof.

It is another object of the present invention to provide a new pool accessory storage unit which may be easily and efficiently manufactured and marketed.

It is a further object of the present invention to provide a new pool accessory storage unit which is of a durable and reliable construction.

An even further object of the present invention is to provide a new pool accessory storage unit which is susceptible of a low cost of manufacture with regard to both materials and labor, and which accordingly is then susceptible of low prices of sale to the consuming public, thereby making such pool accessory storage unit economically available to the buying public.

Still yet another object of the present invention is to provide a new pool accessory storage unit which provides in the apparatuses and methods of the prior art some of the advantages thereof, while simultaneously overcoming some of the disadvantages normally associated therewith.

Still another object of the present invention is to provide a new pool accessory storage unit for storing various pool accessories adjacent a pool in an easily accessible manner.

Even still another object of the present invention is to provide a new pool accessory storage unit that includes a frame having an upper portion and a lower portion each with a rectilinear configuration. The upper portion and lower portion of the frame each are defined by a plurality of interconnected horizontally oriented bars. Each frame each further includes a plurality of stanchions for maintaining the bars of the upper portion and lower portion fixed with respect to each other. A panel assembly is provided including a plurality of flexible panels for encompassing sides and a bottom of the frame, thereby defining an interior space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side cross-sectional view of the couples of the present invention taken along line 3—3 shown in FIG. 2.

FIG. 4 is a side cross-sectional view of the hooks of the present invention taken along line 4—4 shown in FIG. 2.

FIG. 5 is a cross-sectional view of the pile fasteners of the present invention taken along line 5—5 shown in FIG. 1.

DESCRIPTION OF THE PREFERRED EMBODIMENT

Figure 1:
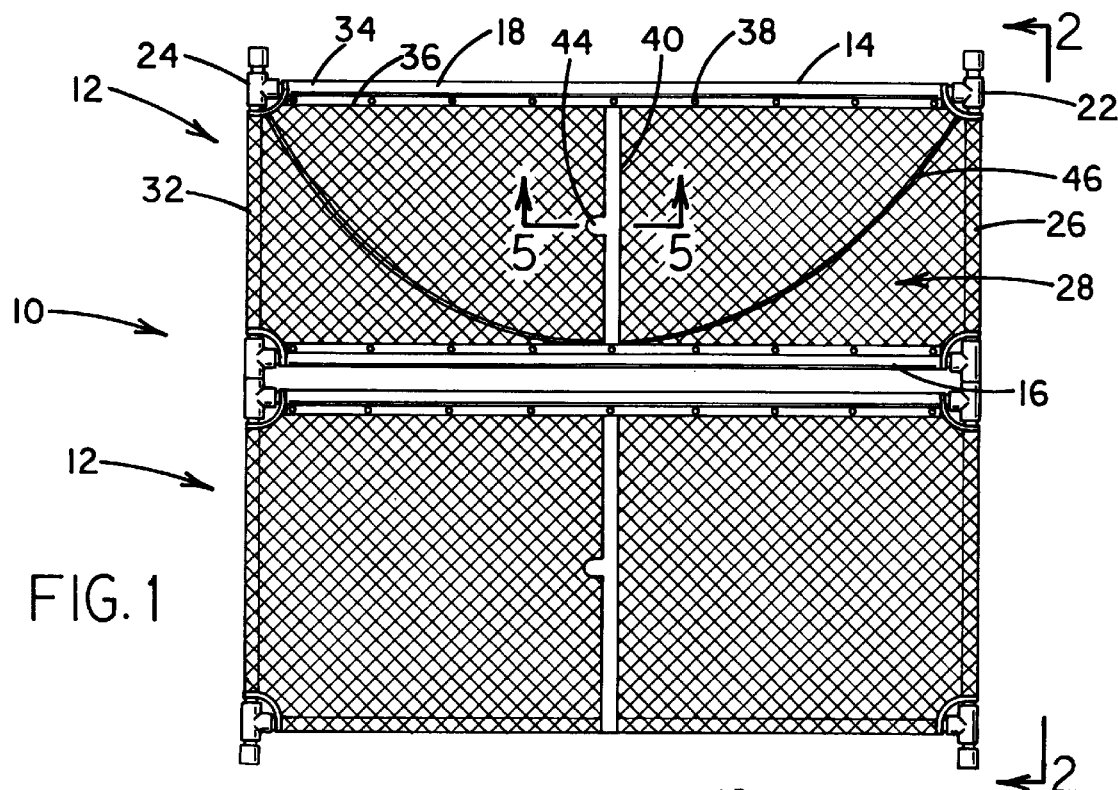
FIG. 1 is a side view of the frames of the present invention in a stacked orientation.

With reference now to the drawings, and in particular to FIGS. 1 through 5 thereof, a new pool accessory storage unit embodying the principles and concepts of the present invention and generally designated by the reference numeral 10 will be described.

The present invention, designated as numeral 10, includes a plurality of stackable PVC or aluminum frames 12 each having an upper portion 14 and a lower portion 16 each with a rectangular configuration. Such upper and lower portions are defined by a pair of elongated side bars 18 and a pair of short end bars 20 interconnected via corner couples 22. Each couple has a tube 24 integrally mounted thereon which resides along an axis which is perpendicular with respect to the bars of the portions of the frame.

Figure 2:
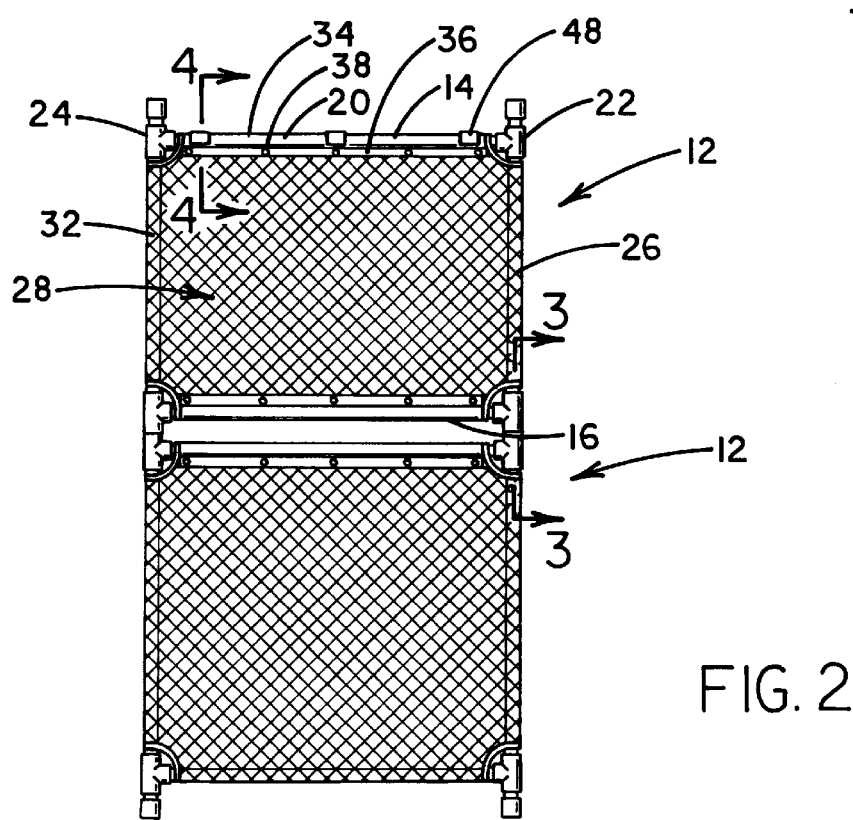
FIG. 2 is an end view of the frames of the present invention in a stacked orientation.

As shown in FIGS. 1 & 2, each frame each further includes four stanchions 26 each with a length equal to that of the end bars of the portions. The stanchions are further coupled between the tubes of the corners of the upper portion and the lower portion of each frame to render a rigid, fixed rectilinear frame. Such frame is design ed to be situated aside a pool deck area.

As an option, the tubes of the couples of the lower portion of a first frame may be coupled with those of the upper portion of a second frame, as shown in FIG. 1. It should be noted that such stacking is carried out when the present invention is to be situated adjacent to a deck of an elevated above ground pool. To carry out this stacking, the tubes of the couples of the upper portions of the frames have a female sleeve while those of the lower portions have male sleeves which are dimensioned to be received by the female sleeves. As an option, rubber feet may also be attached to the tubes for supporting the associated frame.

Next provided are a plurality of net assemblies 28 each adapted to define an interior space within each frame. Each net assembly includes four fiberglass or plastic interconnected meshed nets 30 with a plurality of integral sleeves 32 integrally coupled thereto for being received by the stanchions of the frame. It should be noted that such integral sleeves are shared by each of the nets. The net assembly further includes a plurality of detachable sleeves 34 for being received by the bars of the frames. The detachable sleeves each have a rectangular strip 36 coupled along a length thereof with a plurality of linearly aligned plastic snap fasteners 38 mounted thereon. Such snap fasteners are adapted for releasably coupling with plastic snap fasteners mounted on the meshed nets of the net assembly.

As shown in the FIGS. 1 & 2, the meshed nets come in two lengths. Each of the longer meshed nets of each net assembly have a vertically oriented bisecting slit 40 formed between the detachable sleeves thereof. As such, a pair of termination edges are defined which are each lined with a pile fastener 42. As shown in FIG. 5, a pull tab 44 is coupled to a central extent of the pile fastener and extends therefrom for allowing access to the interior space.

Each net assembly further has a hammock 46 including a meshed net with a rectangular configuration. The hammock is equipped with a pair of free elongated side edges and a pair of short end edges. The short end edges each have a plurality of J-shaped hooks 48 mounted along a length thereof for being hooked onto the end bars of the upper portion of the frame. Note FIG. 4. By this structure, the meshed net of the hammock depends downwardly level with the lower portion of the frame, as shown in FIG. 1. When the frames are stacked, the hammock is mounted on a topmost frame. The present invention may thus be used to store pool accessories such as toys, snorkeling gear, and other such equipment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pool accessory storage unit comprising, in combination:
    a plurality of stackable frames each including an upper portion and a lower portion each having a rectangular configuration defined by a pair of elongated side bars and a pair of short end bars interconnected by a plurality of corner couplers, each of the corner couplers having a tube coupled thereto which resides along an axis which is perpendicular with respect to the side bars and the ends bars of the portions of the frame, each frame each further including four stanchions each with a length equal to that of the end bars of the portions and further coupled between the tubes of the corner couplers of the upper portion and the lower portion of each frame, wherein at least the tubes of the corner couplers of the lower portion of a first frame may be coupled with those of the upper portion of a second frame; and
    a plurality of net assemblies each adapted to define an interior space within each frame, each net assembly including four meshed nets with a plurality of integral sleeves integrally coupled thereto for being received by the stanchions of the frame, the net assembly further including a pair of detachable sleeves for being received by the bars of the frames, the detachable sleeves each having a rectangular strip coupled along a length thereof with a plurality of linearly aligned plastic snap fasteners mounted thereon for releasably coupling with plastic snap fasteners mounted on the meshed nets of the net assembly, at least a pair of the meshed nets of each net assembly having a bisecting slit formed between the detachable sleeves thereof to define a pair of termination edges each lined with a pile fastener and a pull tab coupled to a central extent of the pile fastener and extending therefrom for allowing access to the interior space, each net assembly further including a hammock including a meshed net having a rectangular configuration with a pair of free elongated side edges and a pair of short end edges each having a plurality of J-shaped hooks mounted along a length thereof for being hooked onto the end bars of the upper portion of the frame such that the meshed net of the hammock depends downwardly level with the lower portion of the frame.

2. A pool accessory storage unit comprising:
    a frame including an upper portion and a lower portion each having a rectilinear configuration defined by a plurality of interconnected horizontally oriented bars, each frame each further including a plurality of stanchions for fixing the lower portion with respect to the upper portion;
    a panel assembly including a plurality of flexible panels for encompassing sides and a bottom of the frame, thereby defining an interior space; and
    wherein a slit is formed in one of the panels to define termination edges lined with at least one fastener for allowing selective access to the interior space.

3. A pool accessory storage unit as set forth in claim 2 wherein opposed edges of the panel are removably coupled to the frame.

4. A pool accessory storage unit as set forth in claim 2 wherein the panel assembly includes a hammock including a panel with a pair of free edges and a pair of edges each having a plurality of couplers mounted thereon for being coupled to the bars of the upper portion of the frame such that the panel of the hammock depends downwardly.

5. A pool accessory storage unit as set forth in claim 2 wherein a plurality of the frames are included for being stacked on top of each other, wherein a panel assembly is mounted on a bottom most one of the frames for encompassing sides of the frame.

6. A pool accessory storage unit as set forth in claim 2 wherein each panel is a meshed net.

7. A pool accessory storage unit comprising:
    a frame including an upper portion and a lower portion each having a rectilinear configuration defined by a plurality of interconnected horizontally oriented bars, each frame each further including a plurality of stanchions for fixing the lower portion with respect to the upper portion;
    a panel assembly including a plurality of flexible panels for encompassing sides and a bottom of the frame, thereby defining an interior space; and
    wherein the panel assembly includes a hammock including a panel with a pair of free edges and a pair of edges each having a plurality of couplers mounted thereon for being coupled to the bars of the upper portion of the frame such that the panel of the hammock depends downwardly.

8. A pool accessory storage unit as set forth in claim 7 wherein a plurality of the frames are included for being stacked on top of each other, wherein a panel assembly is mounted on a bottom most one of the frames for encompassing sides of the frame.

9. A pool accessory storage unit as set forth in claim 7 wherein each panel is a meshed net.

* * * * *